Dec. 22, 1953  R. G. ROSS, JR., ET AL  2,663,048
ARTICLE ELEVATING CASTER MOUNTING
Filed March 19, 1951  2 Sheets-Sheet 1
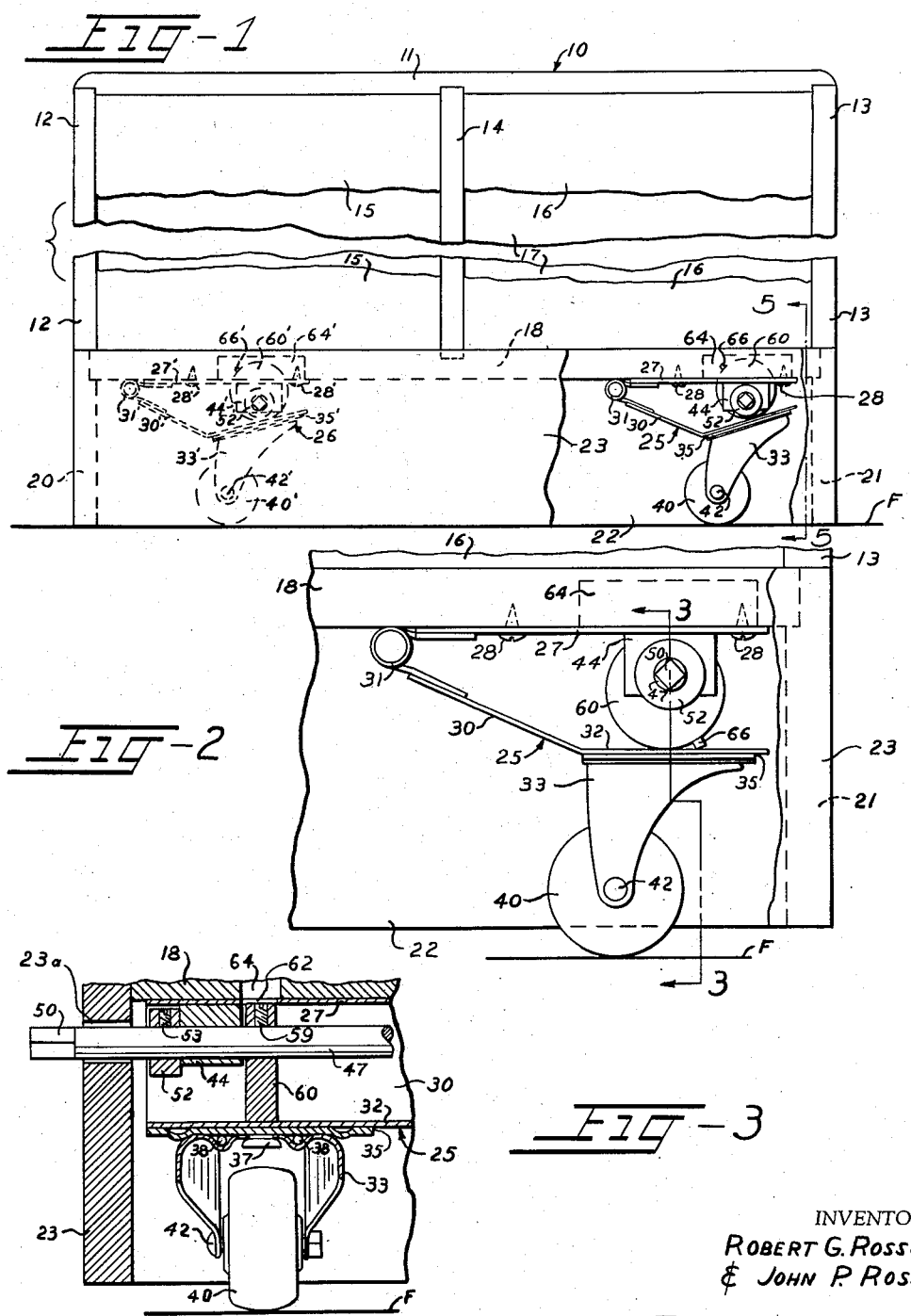
INVENTORS:
ROBERT G. ROSS JR.
& JOHN P. ROSS
BY Eaton & Bell
ATTORNEYS

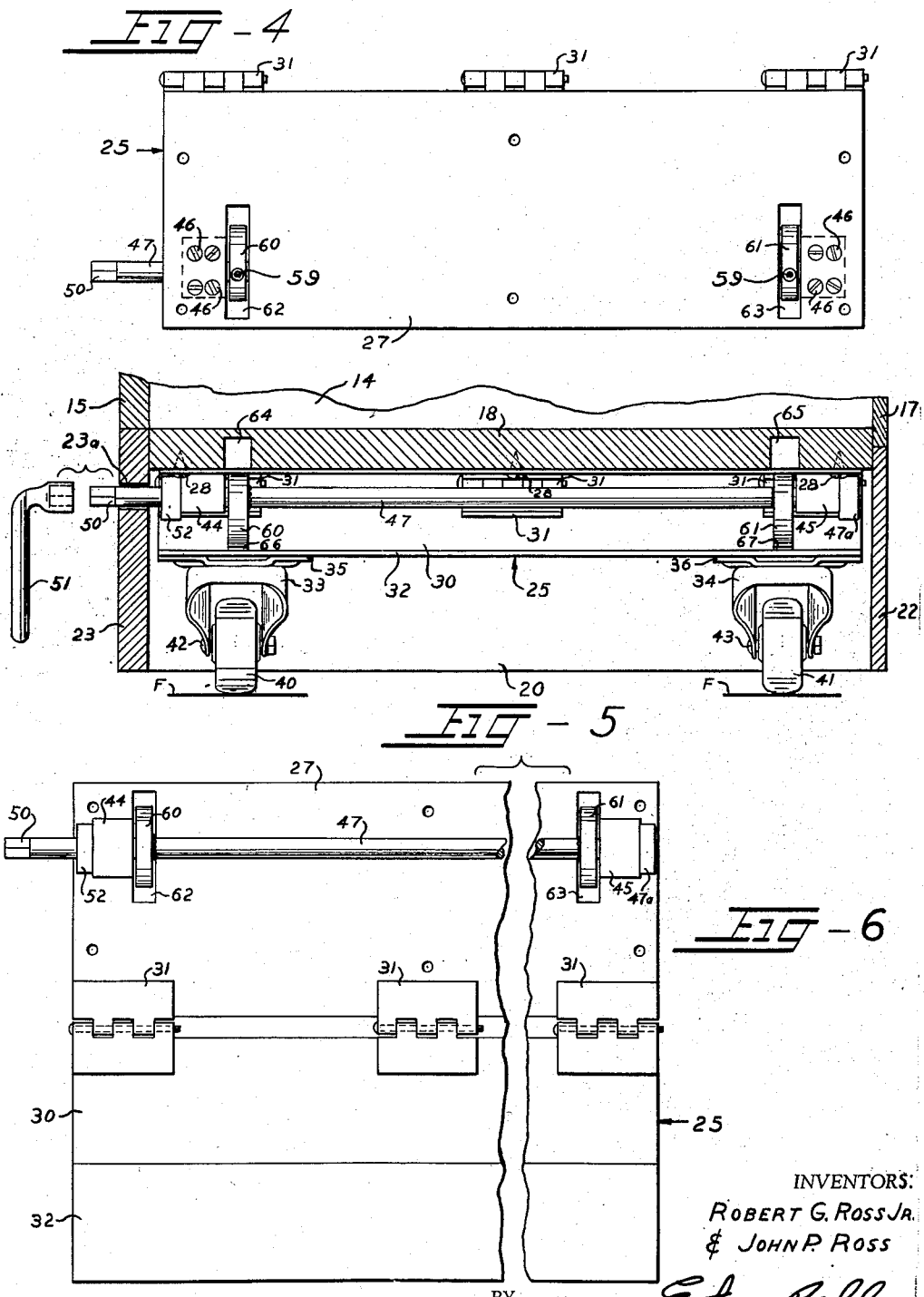

Patented Dec. 22, 1953

2,663,048

UNITED STATES PATENT OFFICE 2,663,048

ARTICLE ELEVATING CASTER MOUNTING

Robert G. Ross, Jr., and John P. Ross,
Charlotte, N. C.

Application March 19, 1951, Serial No. 216,409

7 Claims. (Cl. 16—34)

This invention relates to devices to ease the moving of furniture and the like from one place to another and more especially to an improved cam actuated retractable caster for furniture wherein the caster elements are normally retracted and the furniture is supported by the conventional legs thereof and wherein said caster elements may be moved away from the bottom of the furniture and in contact with the floor to raise the furniture and to permit the same to be moved on the caster rollers.

It is an object of this invention to provide a retractable caster unit for furniture construction to permit heavy furniture and the like to be easily moved and which comprises a retractable caster unit adapted to be secured to the lower part of an article of furniture and having cam actuated means for lowering the same to raise the furniture thus causing the furniture to be supported by the caster rollers.

It is another object of this invention to provide a retractable caster unit for supporting articles of furniture and the like comprising a pair of hinged plates, the uppermost of said plates being secured to the lower surface of an article of furniture and the lowermost of said plates extending downwardly at an angle and then extending in substantially parallel relation to the uppermost of said plates and the lowermost of said plates having at least one caster unit secured thereto. The uppermost plate is provided with bearings in which a cam shaft is suitably journaled and said cam shaft has a cam secured thereon in off center relation thereto and means are provided for turning the cam shaft to actuate the cam against the lowermost plate to cause relative movement between the uppermost plate and the lowermost plate to thereby raise the article, supporting the same on the caster unit, and to permit the same to be moved on the rollers of the caster unit.

It is another object of this invention to provide a retractable caster unit of the type described having upper and lower hinged plates, said lower plate having at least one caster attached thereto and a cam shaft and a cam for lowering the lower plate to cause the caster or casters to be moved into lowered position and said retractable caster unit also being provided with means for holding the casters in lowered position while movement is imparted to the article of furniture.

Some of the objects of the invention having been stated, other objects will appear as the description proceeds when taken in connection with the accompanying drawings, in which—

Figure 1 is a front elevation of an article of furniture, with parts broken away, illustrating the manner in which the improved retractable caster units may be attached thereto;

Figure 2 is an enlarged elevation of the lower right-hand portion of Figure 1 but showing the caster unit in lowered position;

Figure 3 is a vertical sectional view through the improved caster unit taken substantially along the line 3—3 in Figure 2;

Figure 4 is a top plan view of the improved double roller caster unit removed from an article of furniture;

Figure 5 is a fragmentary enlarged side elevation looking at the right-hand side of the right-hand caster unit substantially along the line 5—5 in Figure 1 but showing the casters in lowered position;

Figure 6 is a plan view of the improved caster unit, removed from an article of furniture, with the upper plate thereof swung to open position relative to the lower plate so as to illustrate the lower and upper surfaces of the respective upper and lower plates.

Referring more specifically to the drawings, there will be observed in Figure 1, an article of furniture such as a cabinet 10 which is shown by way of illustration only, it being understood that the present invention may be associated with various types of furniture and the like. The cabinet 10 has a top portion 11, side walls 12 and 13 and may be provided with an intermediate wall 14 and front doors 15 and 16 together with a rear wall 17, all suitably secured to each other in a conventional manner and supported on a bottom 18. A skirt is formed around the lower portion of the cabinet 10, forming side leg portions 20 and 21, a rear leg or support portion 22 and a front leg portion 23, the leg portions 20 to 23, inclusive, serving to support the cabinet 10 on any suitable support such as a floor F. If desired, any suitable type of legs may be provided which will support the bottom 18 in spaced relation to the floor.

In furniture construction of this type, it is usually desirable to provide a skirt or flange portion such as formed by the legs 20 to 23, inclusive, to support the article of furniture and to prevent the accumulation of dust thereunder. If the article of furniture is heavy in weight, it is very difficult to move the furniture from one place to another as may be desired without marring the floor F and, frequently, a hand truck or the like must be used in order to move the furniture.

To overcome this difficulty, there are provided the improved caster units broadly designated at 25 and 26. The caster units 25 and 26 are of identical construction and therefore a description will be given of the right-hand caster unit 25, illustrated as supporting the right-hand portion of the cabinet 10 in Figure 1, like parts of the left-hand caster unit 26 bearing like reference characters with the prime notation added.

The caster unit 25 comprises an upper plate 27 which is suitably secured to the lower right-hand surface of the bottom 18 of the cabinet 10 as by screws 28. A lower plate member 30 is hingedly connected to one side of the upper plate member 27, as at 31, and it will be observed that the lower plate member extends downwardly at an angle from the hinge point 31 and is provided with a flat portion 32 which is disposed in substantially parallel relation to the upper plate 27 when the caster unit is in a lowered or operative position as will readily be observed in Figure 2.

The upper plate 27 and lower plate 30 preferably extend across the entire depth of the cabinet 10 and the flat surface 32 of the lower plate member 30 is provided with a pair of spaced caster brackets 33 and 34. The caster brackets 33 and 34 include bracket plates 35 and 36, respectively, which are suitably secured to the flat portion 32 of the plate 30, as by welding, and swivel pins 37, only one of which is shown in Figure 3, depend from the plates 35 and 36. If desired suitable ball bearings 38 may be provided to facilitate swivel movement of the caster brackets 33 and 34 about the swivel pins 37.

The caster brackets 33 and 34 are provided with caster rollers 40 and 41, respectively, rotatably mounted therein, as by suitable bolts 42 and 43, respectively, penetrating the legs of the brackets 33 and 34. It is thus seen that the caster rollers 40 and 41 may rotate within the brackets 33 and 34, respectively, and the brackets 33 and 34 may pivot about the bracket plates 35 and 36, respectively.

If desired the upper plate 27 and the lower plate 30 may be relatively short in length and have only a single caster roller or bracket secured thereto and one of the caster units thus formed may be placed at each corner of the cabinet. However, it is preferred that a double roller caster unit, such as is illustrated in the drawings, be used thus requiring only two of said units for an article of furniture such as the cabinet 10. By the use of such a unit a caster roller will thus be positioned at each corner of the cabinet and two of the rollers may be actuated simultaneously in a manner to be described.

The upper plate member 27 is provided with a pair of bearing blocks 44 and 45 suitably secured thereto adjacent opposed ends thereof, as by screws 46, and the bearing blocks 44 and 45 have a cam shaft 47 rotatably mounted therein. The cam shaft 47 extends longitudinally of the caster unit 25 and the right-hand end thereof, in Figure 5, is secured against longitudinal sliding movement as by a collar 47a suitably secured on the cam shaft 47 as by a set screw 48. The left-hand end of the cam shaft 47 extends beyond the edge of the plates 27 and 30 and is provided with a plurality of flats 50 adapted to receive a hand crank 51 for manual rotation of the cam shaft 47. The leg portion 23 of the article of furniture 10 has an opening 23a therethrough through which the end of the shaft 47 having the flats 50 thereon extends so as to be accessible to an operator.

The cam shaft 47 is held against longitudinal sliding movement in the bearing 44 by a suitable collar 52 secured on the cam shaft 47 as by a set screw 53. The cam shaft 47 is provided with a pair of spaced cams 60 and 61 secured thereon, as by welding, and it will be observed that the cams 60 and 61 are secured in off-center relation to the cam shaft 47 but in identical or coinciding relation to each other. Each of the cams 60 and 61 is locked in proper adjusted position on the cam shaft 47 by a set screw 59 and is then welded in place as shown. The upper plate member 27 is provided with openings 62 and 63 and the bottom 18 of the cabinet 10 is also provided with cut-out portions or cavities 64 and 65 to permit the cams 60 and 61 to rotate 360 degrees with the cam shaft 47.

Referring to Figure 1, it will be observed that when the flange or skirt portion of the cabinet 10 formed from the legs 20 to 23, inclusive, is resting upon the floor F, the cams 60 and 61 will be positioned with the greater portion thereof disposed above the cam shaft 47. This will permit the flat portion 32 of the lower plate 30 to be disposed at an angle to the upper plate 27 and will permit upward movement of the caster rollers 40 and 41 so that the entire weight of the cabinet 10 will be supported by the legs 20 to 23, inclusive, with the rollers 40 and 41 resting upon the floor F.

Now, when it is desired to lower the caster units 25 and 26 so that the caster rollers will support the weight of the cabinet 10, the hand crank 51 is inserted on the flats 50 of the cam shaft 47 and may be manually rotated in a counter-clockwise direction, from the position shown in Figure 1 to that shown in Figure 2, to cause the greater portion of the cams 60 and 61 to be turned downwardly to engage the flat portion 32 of the plate 30 and to move the free edges of the plates 27 and 30 apart from each other. The caster rollers 40 and 41 will then also move away from the upper plate 27 in engagement with the floor F and lift the legs 20 to 23, inclusive, from engagement with the floor F so that the cabinet will be supported by the caster rollers.

It will be observed that the cams 60 and 61 are each provided with stops or projections 66 and 67, respectively, which are positioned just past dead-center or the highest point on the respective cams 60 and 61 and, as the cam shaft 46 is rotated in a counter-clockwise direction, the stops 66 and 67 will engage the flat surface 32 of the plate 30 immediately after the cams 60 and 61 reach dead-center position as illustrated in Fig. 2, at which time the caster rollers 40 and 41 will be disposed in fully lowered position and will support the entire weight of the cabinet 10. The stops 66 and 67 in this position engage the flat portion 32 of the lower plate 30 and prevent the cams from rotating further in a counter-clockwise direction and, of course, since the high points of the cams 60 and 61 are beyond dead-center they cannot move in a clockwise direction. Thus, the stops 66 and 67 prevent collapse of the retractable caster unit. Since the stops 66 and 67 are positioned just beyond dead-center on the cams 60 and 61, there will be no tendency for the cams to continue to rotate in a counter-clockwise direction and it will thus be observed that the caster rollers 40 and 41 will be held securely in lowered position to support the entire weight of the cabinet 10 and to permit the same to be moved from one place to another.

When it is desired to again lower the cabinet 10, the cam shaft 47 may be rotated in a counter-clockwise or clockwise direction so that the high points of the cams 60 and 61 will be disposed above the cam shaft 47 to thus permit the plate 27 to move downwardly towards the caster rollers 40 and 41, and the weight of the cabinet to then be supported by the legs 20 and 23, inclusive.

It will thus be observed that there is provided an improved caster unit comprising an upper plate having a lower plate hingedly connected thereto and a cam shaft suitably journaled in bearings secured to the upper plate and having a pair of cams disposed thereon in off-center relation thereto and being provided with means for rotating said cams to dead-center position to cause the same to engage the lower plate to move the plates apart from each other so as to support an article of furniture for movement on the caster rollers.

It is evident that the upper plate 27 could be omitted and the bearing blocks 44 and 45 could be secured to the lower surface of the bottom 18 of the cabinet 19. Also, the lower plate 30 would then be hingedly connected to the bottom 18 of the cabinet 10.

In the drawings and specification there has been set forth a preferred embodiment of the invention and although specific terms are employed, they are used in a generic and descriptive sense only and not for purposes of limitation, the scope of the invention being defined in the claims.

We claim:

1. An improved caster unit for an article of furniture and the like having a bottom and also having means, such as legs for supporting the bottom of the article, said improved caster unit comprising an upper plate member adapted to be secured to the lower surface of the bottom of said article, a lower plate member hingedly connected to the upper plate member and disposed beneath the upper plate member, a cam shaft supported for rotation by the upper plate member and being disposed beneath the upper plate member and in parallel relation thereto, a pair of casters secured to the lower surface of the lower plate and spaced apart from each other in substantially parallel relation to the cam shaft, said casters having rollers rotatably mounted thereon, at least one eccentric cam fixedly mounted on said cam shaft and normally having its highest point disposed above the cam shaft the periphery of said cam being in engagement with the lower plate and manually operable means for imparting rotation to the cam shaft to move the highest point of said cam about the axis of the cam shaft to thereby cause the upper plate member to move away from the lower plate member to elevate the article in so doing and whereby the weight of the article will be supported by the rollers of said caster unit for moving the article from one place to another.

2. In a structure according to claim 1, said eccentric cam comprising at least one disk fixedly mounted on the cam shaft and in off-center relation thereto, a stop member projecting from the periphery of said disk and being disposed at a point spaced from the high point of the cam relative to the point at which the lower plate member is hingedly connected to the upper plate member when the high point of the cam is disposed in operative position below the cam shaft to thus prevent unintentional rotation of the cam and its corresponding cam shaft beyond a predetermined point as the stop projection engages the upper surface of the lower plate member and upon the weight of the article being supported by the rollers of said caster unit.

3. An improved caster unit for an article of furniture and the like having a bottom and also having means for supporting the bottom of the article, said improved caster unit comprising a relatively thin upper plate adapted to be secured to the lower surface of the bottom of said article, a lower plate hingedly connected to the upper plate and disposed beneath the upper plate, a cam shaft supported for rotation by the upper plate and being disposed beneath and in parallel closely spaced relation to the lower surface of said upper plate, at least two casters secured to the lower surface of the lower plate and being spaced apart from each other in substantially parallel relation to the cam shaft, said casters having rollers rotatably mounted thereon, at least one eccentric cam fixedly mounted on said cam shaft with its periphery in engagement with the lower plate and normally having its highest point disposed above the cam shaft, manually operable means for imparting rotation to the cam shaft to move the highest point of said cam about the axis of the cam shaft to thereby cause the upper plate to move away from the lower plate to elevate the article in so doing, whereby the weight of the article will be supported by the rollers of said caster unit for moving the article from one place to another, and said upper plate having an opening therethrough through which the high point of said cam may project when said high point is disposed above the cam shaft.

4. An improved caster unit for an article of furniture and the like having a bottom provided with a plurality of cavities therein and also having means for supporting the bottom of the article, said improved caster unit comprising an upper plate adapted to be secured to the lower surface of the bottom of said article, a lower plate hingedly connected to the upper plate and disposed beneath the upper plate, a cam shaft supported for rotation by the upper plate and being disposed beneath and in parallel closely spaced relation to the lower surface of said upper plate, at least two casters secured to the lower surface of the lower plate and being spaced apart from each other in substantially parallel relation to the cam shaft, said casters having rollers rotatably mounted thereon, at least one eccentric cam fixedly mounted on said cam shaft with its periphery in engagement with the lower plate and normally having its highest point disposed above the cam shaft, manually operable means for imparting rotation to the cam shaft to move the highest point of said cam about the axis of the cam shaft to thereby cause the upper plate to move away from the lower plate to elevate the article in so doing, whereby the weight of the article will be supported by the rollers of said caster unit for moving the article from one place to another, and said upper plate having an opening therethrough adapted to coincide with one of the cavities in the bottom of the cabinet and through which the high point of said cam may project when said high point is disposed above the cam shaft.

5. An improved caster unit for an article of furniture and the like having a bottom and also having means, such as legs, for supporting the bottom of the article, said improved caster unit comprising an upper plate member adapted to be secured to the lower surface of the bottom of said article, a lower plate member hingedly connected to the upper plate member and disposed beneath the upper plate member, said lower plate member having a portion extending at an angle from said hinge point and a flat portion extending in spaced substantially parallel relation to said upper plate member when said caster unit is in operative position, a cam shaft supported for rotation by the upper plate member and being disposed beneath the upper plate member and in parallel relation thereto, a pair of casters secured to the lower surface of the lower plate and spaced apart from each other in substantially parallel relation to the cam shaft, said casters having rollers rotatably mounted thereon, at least one eccentric cam fixedly mounted on said cam shaft with its periphery in engagement with the lower plate member and normally having its highest point disposed above the cam shaft and manually operable means for imparting rotation to the cam shaft to move the highest point of said cam about the axis of the cam shaft to engage the flat portion of said lower plate member to thereby cause the upper plate member to move away from the lower plate member to elevate the article in so doing and whereby the weight of the article will be supported by the rollers of said caster unit for moving the article from one place to another.

6. An improved caster unit for an article of furniture and the like having a bottom and legs supporting the bottom in spaced relation to the surface on which the article rests comprising a pair of hinged plates, one of said plates being adapted to be secured to the bottom of said article and the other of said plates having caster rollers mounted thereon, a cam shaft supported for rotation by one of said plates and at least one eccentric cam on said cam shaft having its periphery in engagement with the other of said plates during at least a portion of its rotation whereby rotation of said cam shaft will cause said plates to move apart from each other or to allow said plates to move toward each other to raise or lower said article relative to its supporting surface.

7. An improved caster unit for an article of furniture and the like having a bottom and legs supporting the bottom in spaced relation to the surface on which the article rests comprising an upper plate and a lower plate hingedly interconnected, said upper plate being adapted to be secured to the bottom of said article, the lower plate having caster rollers depending therefrom, a cam shaft supported for rotation by said upper plate, at least one eccentric cam on said cam shaft with its periphery in engagement with said lower plate during at least a portion of its rotation, whereby rotation of said cam shaft will cause said plates to move apart from each other or to allow said plates to move toward each other to raise or lower said article relative to its supporting surface.

ROBERT G. ROSS, Jr.
JOHN P. ROSS.

References Cited in the file of this patent

UNITED STATES PATENTS

| Number | Name | Date |
|---|---|---|
| 184,342 | Cogger | Nov. 14, 1876 |
| 935,289 | Wood | Sept. 28, 1909 |
| 2,309,214 | Rey | Jan. 26, 1943 |
| 2,334,364 | Vavrik et al. | Nov. 16, 1943 |